United States Patent
Katoh et al.

(10) Patent No.: US 12,285,817 B2
(45) Date of Patent: Apr. 29, 2025

(54) FRICTION STIR JOINING ATTACHMENT, FRICTION STIR JOINING HEAD, AND FRICTION STIR JOINING APPARATUS

(71) Applicant: SHIBAURA MACHINE CO., LTD., Tokyo (JP)

(72) Inventors: Kouichi Katoh, Shizuoka (JP); Hirohiko Matsuzaki, Shizuokja (JP); Toshinao Aoki, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 44 days.

(21) Appl. No.: 18/271,997

(22) PCT Filed: Dec. 24, 2021

(86) PCT No.: PCT/JP2021/048193
§ 371 (c)(1),
(2) Date: Jul. 12, 2023

(87) PCT Pub. No.: WO2022/153841
PCT Pub. Date: Jul. 21, 2022

(65) Prior Publication Data
US 2024/0082946 A1 Mar. 14, 2024

(30) Foreign Application Priority Data
Jan. 15, 2021 (JP) ................. 2021-005048

(51) Int. Cl.
*B23K 20/00* (2006.01)
*B23K 20/12* (2006.01)

(52) U.S. Cl.
CPC ........ *B23K 20/1255* (2013.01); *B23K 20/125* (2013.01)

(58) Field of Classification Search
CPC .. B25B 5/00; B25B 1/24; B23Q 3/002; B23Q 3/069; B23K 20/126; B23K 20/122;
(Continued)

(56) References Cited

U.S. PATENT DOCUMENTS

| 3,034,549 A | 5/1962 | Quackenbush |
| 6,302,315 B1 | 10/2001 | Thompson |

(Continued)

FOREIGN PATENT DOCUMENTS

| JP | H10305372 A | 11/1998 |
| JP | 2004105975 A | 4/2004 |

(Continued)

OTHER PUBLICATIONS

International Preliminary Report on Patentability for International Application No. PCT/JP2021/048193, mailed Jul. 27, 2023, 9 pages.

(Continued)

*Primary Examiner* — Erin B Saad
(74) *Attorney, Agent, or Firm* — DLA Piper LLP (US)

(57) ABSTRACT

A friction stir welding attachment includes a body configured to be attached to a spindle of a machine tool, a metalworking shaft rotatably supported by the body and including an attachment portion configured to attach a welding tool at an end thereof, and a pair of press components supported by the body and provided at respective sides across the attachment portion. The press components are each made of disc-shaped elastic material and are each supported in a manner rotatable around a rotation axis diagonally intersecting a rotation axis of the metalworking shaft.

14 Claims, 4 Drawing Sheets

(58) Field of Classification Search
CPC ............... B23K 20/123; B23K 20/125; B23K 20/1205; B23K 20/129; B23K 37/0435
See application file for complete search history.

(56) References Cited

U.S. PATENT DOCUMENTS

| | | | |
|---|---|---|---|
| 6,367,681 B1 | 4/2002 | Waldron et al. | |
| 7,028,880 B2* | 4/2006 | Narita | B23K 20/126 228/112.1 |
| 7,264,426 B2 | 9/2007 | Buttrick, Jr. | |
| 7,404,512 B2* | 7/2008 | Baumann | B23K 20/126 228/2.1 |
| 7,490,750 B2* | 2/2009 | Trapp | B23K 20/126 228/2.1 |
| 7,992,761 B2* | 8/2011 | Baumann | B23K 20/123 228/102 |
| 8,047,242 B2 | 11/2011 | Wall et al. | |
| 9,205,533 B2* | 12/2015 | Matlack | B23K 20/123 |
| 11,813,692 B2* | 11/2023 | Okada | B23K 20/125 |
| 2002/0190100 A1 | 12/2002 | Duncan | |
| 2004/0129763 A1* | 7/2004 | Burford | B23K 20/123 228/2.1 |
| 2005/0189127 A1 | 9/2005 | Martin et al. | |
| 2006/0102689 A1* | 5/2006 | Trapp | B23K 20/126 228/2.1 |
| 2008/0084018 A1 | 4/2008 | Baumann et al. | |
| 2008/0112768 A1 | 5/2008 | Matlack et al. | |
| 2009/0067939 A1 | 3/2009 | Carr et al. | |
| 2010/0143057 A1 | 6/2010 | Breese | |
| 2010/0176106 A1* | 7/2010 | Christensen | B23K 37/0264 219/136 |
| 2010/0232894 A1* | 9/2010 | Burton | B23Q 3/12 219/52 |
| 2011/0255930 A1 | 10/2011 | Eriksson et al. | |
| 2013/0255884 A1 | 10/2013 | Baumann et al. | |
| 2015/0097021 A1* | 4/2015 | Persson | B65G 15/00 228/114.5 |
| 2015/0143686 A1 | 5/2015 | Blacket et al. | |
| 2015/0219521 A1 | 8/2015 | Clew et al. | |
| 2016/0214204 A1 | 7/2016 | Comfort et al. | |
| 2017/0151626 A1 | 6/2017 | Larsson et al. | |
| 2017/0297143 A1* | 10/2017 | Saito | B23K 20/1265 |
| 2017/0361394 A1* | 12/2017 | Bartos | B23K 20/1245 |
| 2018/0161915 A1 | 6/2018 | Smitherman et al. | |
| 2021/0146490 A1 | 5/2021 | Zheng et al. | |
| 2021/0178528 A1* | 6/2021 | Kloepfer | B23K 37/0211 |
| 2022/0009024 A1* | 1/2022 | Yoshikawa | B23K 20/1255 |
| 2022/0134471 A1* | 5/2022 | Okada | B23K 20/1245 228/112.1 |
| 2023/0047903 A1* | 2/2023 | Price | B23K 20/1255 |
| 2024/0017334 A1 | 1/2024 | Watford et al. | |
| 2024/0066622 A1 | 2/2024 | Katoh et al. | |
| 2024/0116130 A1 | 4/2024 | Katoh et al. | |

FOREIGN PATENT DOCUMENTS

| | | |
|---|---|---|
| JP | 2007000876 A | 1/2007 |
| JP | 2009166204 A | 7/2009 |
| JP | 2017-127881 | 7/2017 |
| JP | 2019195889 A | 11/2019 |
| JP | 2021-171776 | 11/2021 |

OTHER PUBLICATIONS

International Search Report and Written Opinion for International Application No. PCT/JP2021/048193, mailed Mar. 15, 2022, 11 pages.
International Preliminary Report on Patentability for International Application No. PCT/JP2021/048435, mailed Jul. 27, 2023, 9 pages.
International Search Report and Written Opinion for International Application No. PCT/JP2021/048435, mailed Mar. 15, 2022, 11 pages.
U.S. Appl. No. 18/272,000.

* cited by examiner

FRICTION STIR JOINING ATTACHMENT, FRICTION STIR JOINING HEAD, AND FRICTION STIR JOINING APPARATUS

CROSS REFERENCE TO RELATED APPLICATIONS

This application is a U.S. National Stage Application of International Application No. PCT/JP2021/048435 filed Dec. 24, 2021, which claims priority from Japanese Patent Application No. 2021-005048 filed Jan. 15, 2021. The entirety of all the above-listed applications are incorporated herein by reference.

TECHNICAL FIELD

The present invention relates to a friction stir welding attachment, a friction stir welding head, and a friction stir welding machine.

BACKGROUND

Friction stir welding is used in order to weld materials.

High torque, which is necessary for rotating a welding tool for friction stir welding in order to produce sufficient frictional heat, has been typically achieved by a dedicated friction stir welding machine. Meanwhile, as long as high torque can be produced, a general-purpose machine tool can be used as a friction stir welding machine (see JP 2017-127881 A (referred to herein as "Patent Literature 1").

A rotation axis of the welding tool of the above-mentioned Patent Literature 1 is vertically arranged with respect to a surface of a workpiece to be welded. In contrast, it has been proposed to slant the rotation axis of the welding tool so that an end of the welding tool is offset toward a front side in a movement direction to enhance performance for the welding tool to penetrate a workpiece and to retain a softened material in position.

The slanted attitude of the rotation axis of the welding tool is achieved by: providing a slant mechanism including a flexible joint to a friction stir welding attachment, to which a welding tool or a friction stir welding head including the welding tool is attachable; or by adjusting an attitude of a spindle of a machine tool so that the spindle is slanted.

In typical friction stir welding including the above-described Patent Literature 1, a joint line, along which a rotary welding tool is moved to perform friction stir welding on a workpiece to be welded, is linear. In contrast, it is desired that friction stir welding is performed along a joint line of a more complicated shape, such as the one that is bent halfway or is curved. It has thus been demanded that the slant direction, in addition to the movement direction, of the welding tool can be easily changed.

In response to such a demand, the present applicant has developed a friction stir welding attachment including: a body to be attached to a spindle of a machine tool; a metalworking shaft that is rotatably supported by the body, the welding tool being attachable to the metalworking shaft; and a rotation drive unit configured to rotate the metalworking shaft, where the rotation drive unit is in a form of an air motor driven by center through air supplied through the spindle (JP Patent Application No. 2020-075490).

SUMMARY OF THE INVENTION

During friction stir welding with the use of a general-purpose machine tool, the workpiece is kept flatly along a surface of a table of the machine tool. However, the workpiece is sometimes deformed on account of heat generated during friction stir welding to be warped upward at a part along the joint line, so that the workpiece is possibly not appropriately welded when a level difference is caused between pieces of the workpiece to be welded.

In order to keep the workpiece from being warped upward, it is conceivable to add a press component for pressing the workpiece from a top side (i.e. a side opposite a backing member) of the workpiece. However, such a component is difficult to be added to a general-purpose machine tool. In addition, for instance, when the joint line is not a linear line but is a curve of a variety of shapes, it is further difficult to press the workpiece with the press component in advance of the welding tool.

In contrast, when the press component is configured to slide on the workpiece, there possibly occur frictional resistance and scars on the surface of the workpiece. In addition, when there are irregularities on the workpiece along the joint line, the movement of the press component is possibly hindered by an interference between the press component and the irregularities.

It is thus desired to develop a means capable of keeping a workpiece from being warped upward with a simple structure and applicable to various workpieces to be welded.

An object of the invention is to provide a friction stir welding attachment, a friction stir welding head, and a friction stir welding machine that are capable of keeping a workpiece from being warped upward with a simple structure and applicable to various workpieces to be welded.

A friction stir welding attachment according to an aspect of the invention includes: a body to be attached to a spindle or a spindle head of a machine tool; a metalworking shaft rotatably supported by the body and provided with an attachment portion for a welding tool at an end thereof; and a pair of press components supported by the body and provided at respective sides across the attachment portion, in which the press components are each made of a disc-shaped elastic material and are each supported in a manner rotatable around a rotation axis diagonally intersecting a rotation axis of the metalworking shaft.

According to the above aspect of the invention, friction stir welding can be performed on the workpiece by attaching the welding tool to the attachment portion and rotating the metalworking shaft. At this time, the workpiece can be kept from being warped upward at respective sides across the welding tool by pressing the pair of press components onto the workpiece.

The press components, which are rotatably supported disc-shaped components, can roll on the workpiece to follow the movement of the welding tool when the welding tool moves with respect to the workpiece. Accordingly, the friction against the workpiece can be reduced and irregularities on the workpiece can be overridden, thereby constantly and stably pressing the workpiece.

Further, each of the press components made of an elastic material, whose rotation axis is diagonal with respect to the metalworking shaft (i.e. with respect to the surface of the workpiece) and which is elastically deformed by pressing force in advance when being pressed against the workpiece, can constantly produce stable pressing force against the workpiece.

In the friction stir welding attachment according to the above aspect of the invention, it is preferable that the body is attached to the spindle, and a rotation drive unit configured to rotate the metalworking shaft is provided in the body.

According to the above arrangement, the body is attached to the spindle. Accordingly, the direction of inclination of the body and the welding tool can be freely changed by controlling a rotary angle position of the spindle of the machine tool.

Thus, by slanting the rotation axis of the welding tool so that a distal end of the welding tool is offset toward a front side in a movement direction, performance for the welding tool to penetrate the workpiece and to retain a softened material in position can be enhanced.

It should be noted that the body is optionally attached to the spindle head and the metalworking shaft is optionally connected to the spindle. With a use of a multiaxis-control machine tool, the direction of the body can be changed by controlling the direction of the spindle head.

In the friction stir welding attachment according to the above aspect of the invention, it is preferable that the rotation drive unit is an air motor configured to be rotated by air supplied through an axial center of the spindle.

According to the above arrangement, with the use of the air from the spindle, no external power supply or the like is necessary, so that power source can be easily provided.

It should be noted that the rotation drive unit of the invention is optionally embodied in a form of an electric motor, to which electric power is supplied from the spindle head through a cable.

In the friction stir welding attachment according to the above aspect of the invention, it is preferable that a profile of an outer circumferential portion of each of the press components in a cross section along a rotation axis is arc-shaped.

According to the above arrangement, when the press components are diagonally pressed against the workpiece, a part of the arc-shape can be constantly in contact with the workpiece at the same conditions irrespective of elastic deformation of the press components by the pressing force.

A friction stir welding head according to another aspect of the invention includes: the friction stir welding attachment according to the above aspect of the invention; and the welding tool attached to the friction stir welding attachment.

The above aspect of the invention can achieve the same advantages as those of the friction stir welding attachment according to the above-described aspect of the invention.

A friction stir welding machine according to still another aspect of the invention includes: the friction stir welding attachment according to the above aspect of the invention; the welding tool attached to the friction stir welding attachment; and the machine tool attached with the friction stir welding attachment.

The above aspect of the invention can achieve the same advantages as those of the friction stir welding attachment according to the above-described aspect of the invention.

According to the above aspects of the invention, a friction stir welding attachment, a friction stir welding head, and a friction stir welding machine that are capable of keeping a workpiece from being warped upward with a simple structure and applicable to various workpieces to be welded can be provided.

DESCRIPTION OF EMBODIMENT(S)

Figure 1:
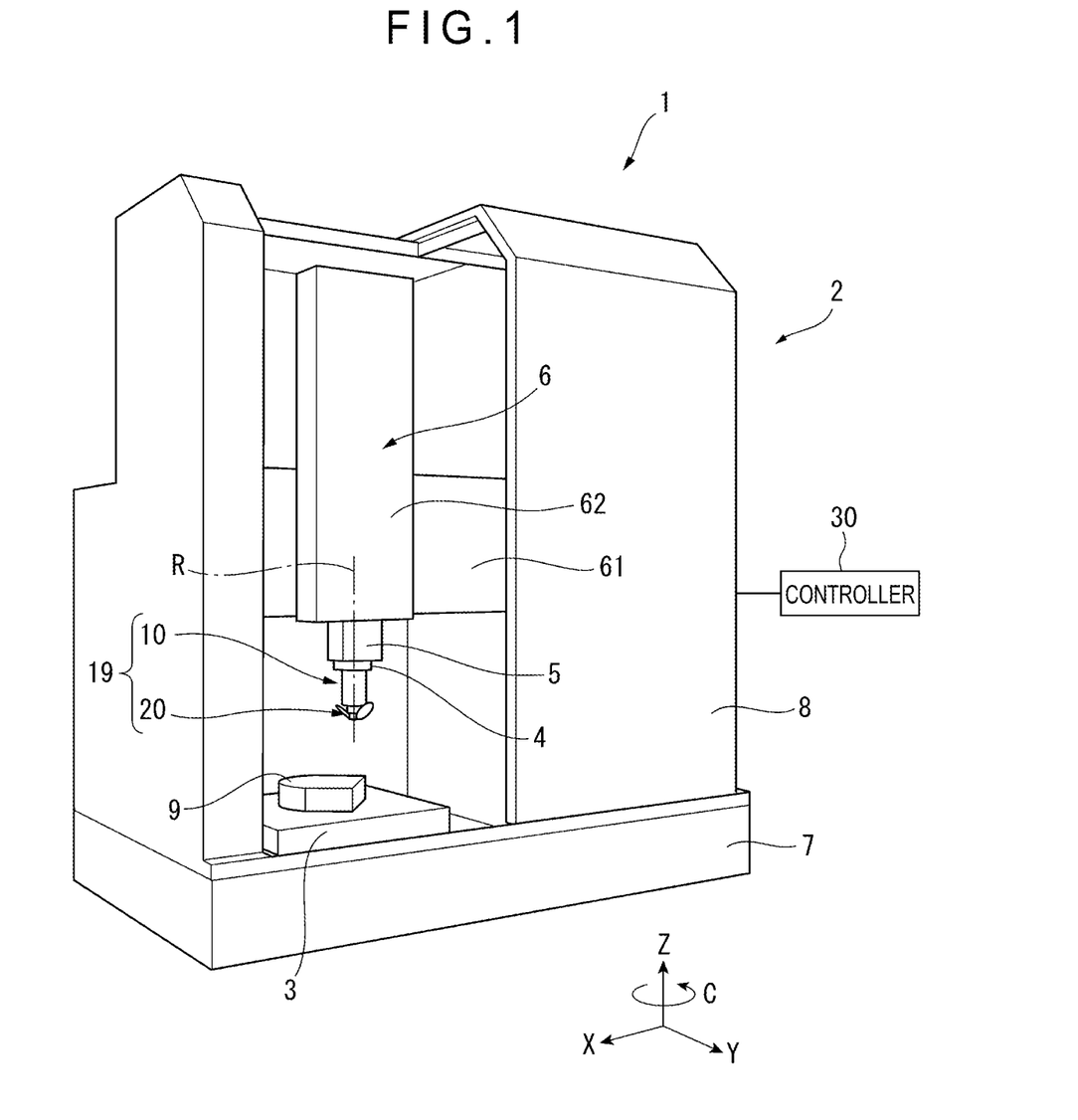
FIG. 1 is a perspective view depicting a friction stir welding machine according to a first example embodiment of the invention.
Figure 2:
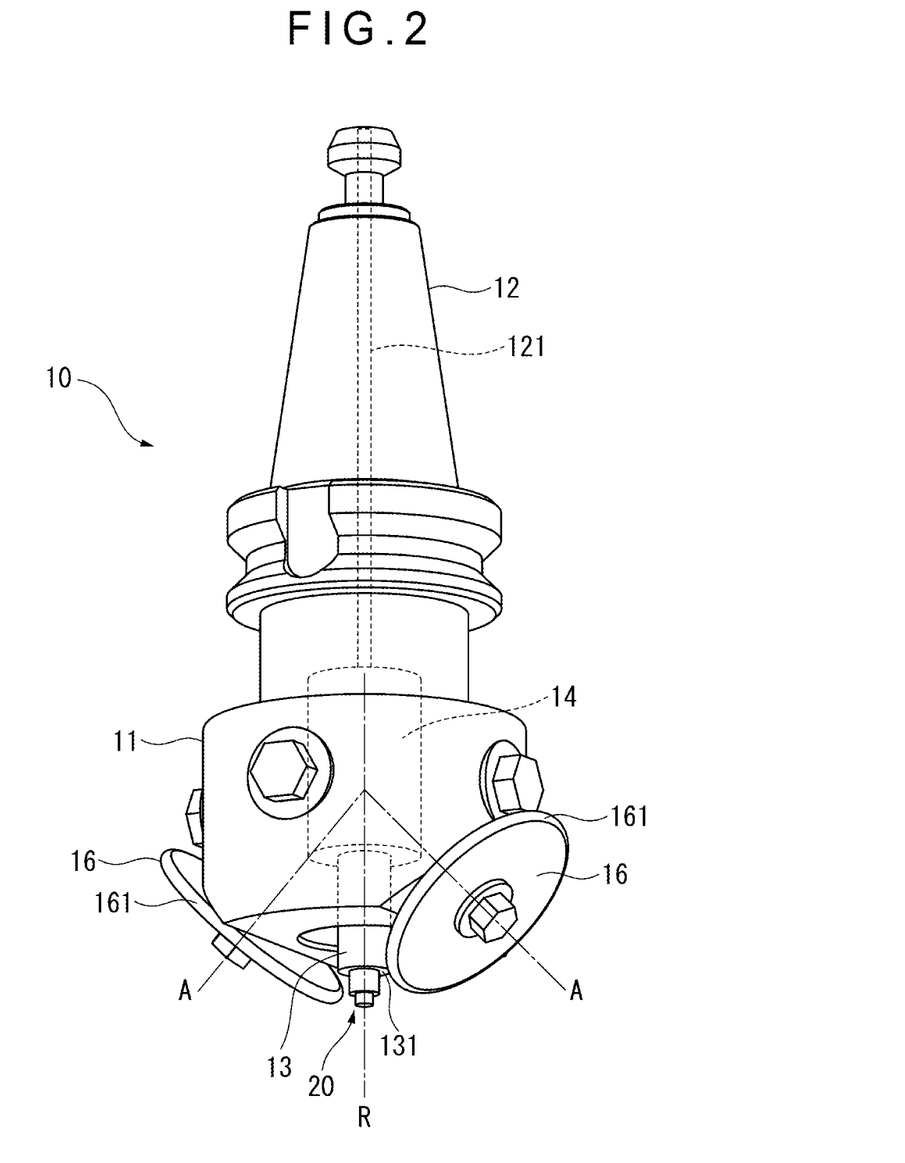
FIG. 2 is a perspective view depicting a friction stir welding attachment of the first example embodiment.
Figure 3:
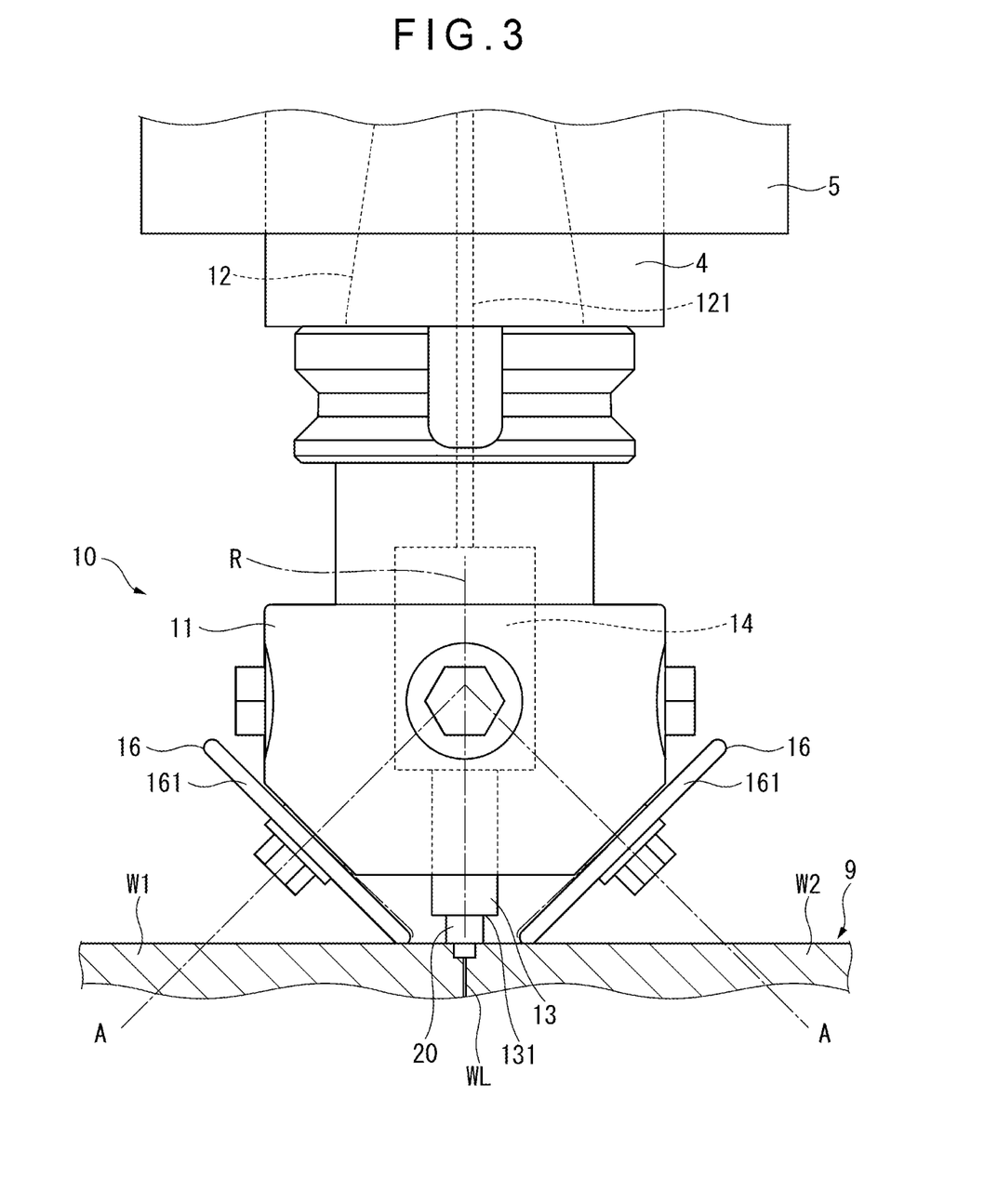
FIG. 3 is a side elevational view depicting how the friction stir welding attachment of the first example embodiment is attached.

FIGS. 1 to 3 depict a first example embodiment of the invention.

As depicted in FIG. 1, a friction stir welding machine 1 of the present example embodiment is provided by attaching a friction stir welding attachment 10 according to the invention and a general-purpose welding tool 20 for friction stir welding to a general-purpose machine tool 2 having a vertical spindle.

The machine tool 2 includes: a table 3, on which a workpiece 9 is to be fixed; a spindle 4 having a distal end to which a tool is attachable; a spindle head 5 supporting the spindle 4 so that the spindle 4 is rotatable; and a moving mechanism 6 configured to move the spindle head 5 to a desired position.

The moving mechanism 6 includes a slider 62 supported by a horizontal guide bar 61. The spindle head 5 is supported by the slider 62 in a manner extending downward. Accordingly, the spindle head 5, which is moved up and down with respect to the slider 62, is configured to move the distal end of the spindle 4 to a desired position in a Z axis direction. Further, the slider 62, which is moved along the guide bar 61, is configured to move the distal end of the spindle 4 to a desired position in an X axis direction.

The spindle 4, whose rotation axis R extends vertically (i.e. in the Z axis direction), is rotatable around the rotation axis R (i.e. in a C axis direction) by a drive motor in the spindle head 5 and is stoppable at a desired angle position.

The table 3 is rotatable around a vertical axis line (i.e. in the C axis direction) and is stoppable at a desired angle position by a drive mechanism installed in the bed 7.

The table 3, spindle 4, spindle head 5 and moving mechanism 6 are optionally entirely surrounded by a cover 8 that is provided on an upper side of the bed 7 and configured to be opened/closed.

The welding tool 20 is attached to the spindle 4 through the friction stir welding attachment 10 according to the invention. A friction stir welding head 19 of the invention is constructed by attaching the welding tool 20 to the friction stir welding attachment 10.

As depicted in FIG. 2, the friction stir welding attachment 10 includes: a body 11 to be attached to the spindle 4 of the machine tool 2; a metalworking shaft 13 supported in a rotatable manner and provided with an attachment portion 131 for the welding tool 20 at an end thereof; a rotation drive unit 14 configured to rotate the metalworking shaft 13; and a pair of press components 16 supported by the body 11 and provided at respective sides across the attachment portion 131.

The body 11, which is configured to be attached to the spindle 4 through a standard-compliant tapered shank 12, has a center through hole 121 extending along an axial center thereof. Center through air can be supplied into the center through hole 121 from the spindle 4.

The rotation drive unit 14, which is provided by an air motor(s) configured to be rotated by high-pressure air, is rotatable by the center through air supplied from the spindle 4 through the center through hole 121 to rotate the metalworking shaft 13.

Each of the press components 16, which is made of a disc-shaped elastic material, is supported in a manner rotatable around a rotation axis A diagonally intersecting the rotation axis R of the metalworking shaft 13.

An outer circumferential portion 161 of the press component 16 is formed to have a semi-circular profile in a cross section in a diameter direction (i.e. an arc whose center angle is approximately 180 degrees).

In the body 11, a rotation center axis of the metalworking shaft 13 is slightly (approximately 0 to 5 degrees) slanted with respect to the rotation axis R of the spindle 4.

The direction for the rotation center axis of the metalworking shaft 13 to be slanted is in a direction orthogonal to the rotation axes A of the pair of press components 16 (i.e. toward a direction orthogonal to the sheet of later-described FIG. 3).

As depicted in FIG. 3, in order to perform friction stir welding using the friction stir welding attachment 10 of the present example embodiment, the friction stir welding attachment 10 is attached to the spindle 4 after the welding tool 20 is attached to the attachment portion 131. Then, the center through air is supplied from the spindle 4 through the center through hole 121 to rotate the metalworking shaft 13 and the welding tool 20 by the rotation drive unit 14, where the welding tool 20 is brought close to a joint line WL of to-be-welded components W1, W2 of the workpiece 9.

Then, the rotating welding tool 20 is introduced onto the joint line WL and, simultaneously, the press components 16 are brought into contact with the surface of the workpiece 9. When the press components 16 are brought into contact with the workpiece 9, sufficient pressing force is applied so that the press components 16 are elastically deformed to be bent (see chain lines in FIG. 3).

The direction of the friction stir welding attachment 10 is adjusted by the spindle 4 so that the metalworking shaft 13 is slanted in a direction along the joint line WL. In this state, the spindle 4 is moved along the joint line WL to perform friction stir welding on the joint line WL by the welding tool 20. The press components 16, which press the to-be-welded components W1, W2 of the workpiece 9 at respective sides across the welding tool 20, roll on the to-be-welded components W1, W2 in accordance with the movement of the welding tool 20 to keep the to-be-welded components W1, W2 from being warped upward at the portion friction-stir-welded by the welding tool 20.

According to the present example embodiment, the following advantages can be achieved.

In the present example embodiment, friction stir welding can be performed on the workpiece 9 by rotating the metalworking shaft 13 with the welding tool 20 being attached to the attachment portion 131. At this time, the to-be-welded components W1, W2 of the workpiece 9 can be kept from being warped upward at respective sides across the welding tool 20 by pressing the pair of press components 16 onto the workpiece 9.

The press components 16, which are rotatably supported disc-shaped components, can roll on the workpiece 9 to follow the movement of the welding tool 20 when the welding tool 20 moves with respect to the workpiece 9. Accordingly, the friction against the workpiece 9 can be reduced and irregularities on the workpiece 9 can be overridden, thereby constantly and stably pressing the workpiece 9.

Further, each of the press components 16 made of an elastic material, whose rotation axis A is diagonal with respect to the metalworking shaft 13 (i.e. with respect to the surface of the workpiece 9) and which is elastically deformed by pressing force in advance when being pressed against the workpiece 9, can constantly produce stable pressing force against the workpiece 9.

In the present example embodiment, the body 11 is attached to the spindle 4. Accordingly, the direction of inclination of the body 11 and the welding tool 20 can be freely changed by controlling the rotary angle position of the spindle 4 of the machine tool 2.

Thus, by slanting the rotation axis R of the welding tool 20 so that a distal end of the welding tool 20 is offset toward a front side in a movement direction, performance for the welding tool to penetrate the workpiece 9 and to retain a softened material in position can be enhanced.

In the present example embodiment, the rotation drive unit 14 is provided by an air motor(s) driven by air from the spindle 4. Accordingly, for instance, it is not necessary to supply external power, so that power source can be easily provided.

Each of the press components 16 of the present example embodiment, which has the outer circumferential portion 161 having a semi-circular profile in a cross section along the rotation axis A, can be brought into contact with the workpiece 9 constantly at the same conditions at a part of the arc even when the press components 16 are elastically deformed by pressing force applied when being diagonally pressed against the workpiece 9.

Figure 4:
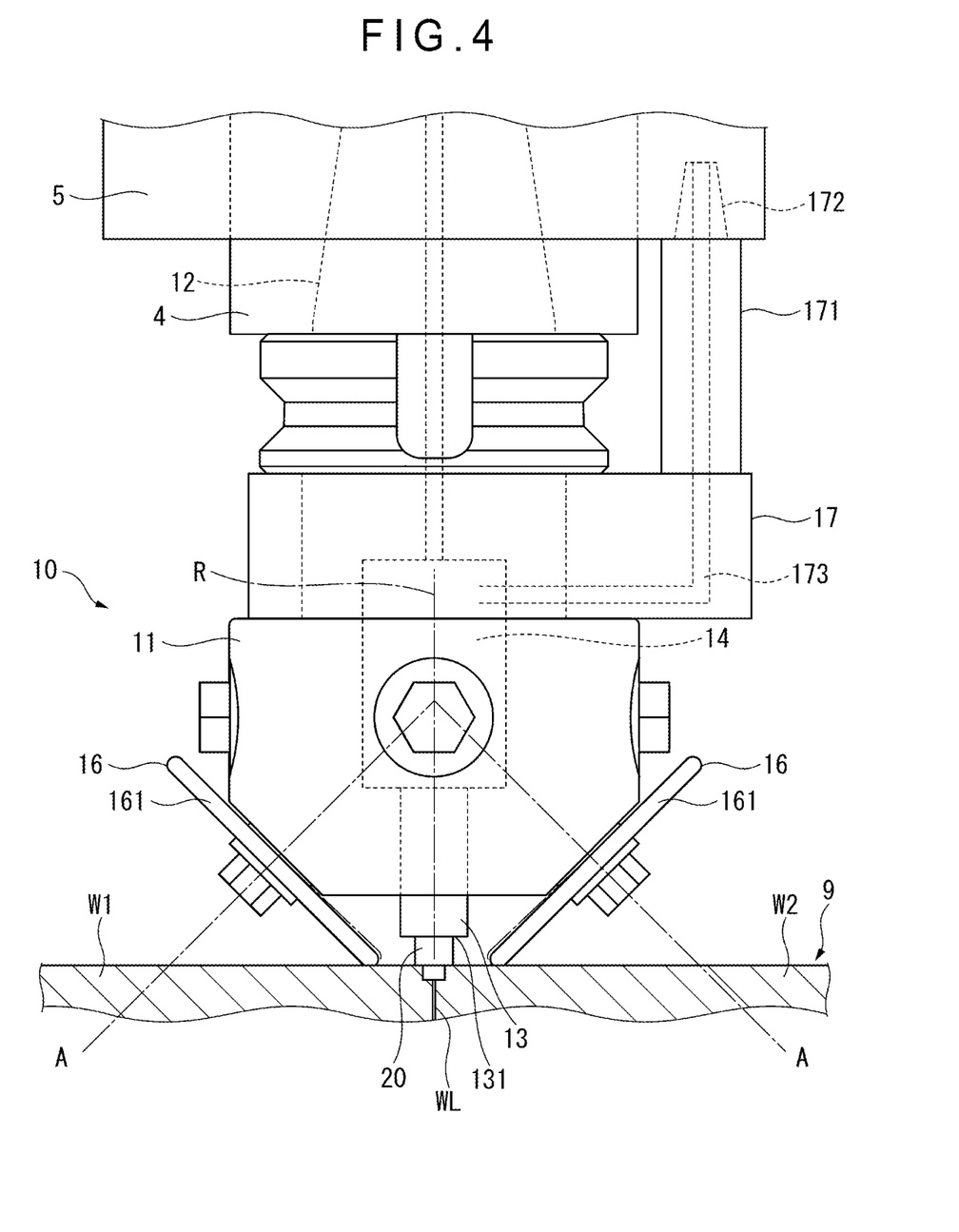
FIG. 4 is a side elevational view depicting a friction stir welding attachment of a second example embodiment of the invention.

FIG. 4 depicts a second example embodiment of the invention.

The present example embodiment, whose basic arrangement is the same as that in the above-described first example embodiment, is different in terms of an air supply channel to the rotation drive unit 14. Accordingly, duplicated description for the component(s) common to those in the first example embodiment will be omitted and different part(s) will only be described below.

In the above-described first example embodiment, the center through hole 121 is provided in the body 11 and the rotation drive unit 14 is rotated by the center through air supplied from the spindle 4.

In contrast, an outer circumferential component 17 is provided around the outer circumference of the body 11 in the present example embodiment, as depicted in FIG. 4.

The outer circumferential component 17, which is provided around the outer circumference of the body 11 in a manner rotatable around the rotation axis R, is connectable to the spindle head 5 through an extension component 171 and a sub shank 172.

An air channel is formed through the sub shank 173 to the outer circumferential component 17, so that air can be supplied from the spindle head 5. Air can be supplied between the outer circumferential component 17 and the body 11, specifically to the rotation drive unit 14 through an annular groove, which is formed on an inner circumferential surface of the outer circumferential component 17 and/or an outer circumferential surface of the body 11.

In the present example embodiment, drive air of the rotation drive unit 14 can be supplied through the spindle head 5. Accordingly, even when the spindle 4 has no mechanism for supplying the center through air, air can be supplied to the rotation drive unit 14 by providing an air supply pipe to the spindle head 5.

Further, with the presence of the outer circumferential component 17, which is only required to be fixed on the spindle head 5, the body 11 is rotatable with respect to the outer circumferential component 17, so that the direction of the inclination of the body 11 and the welding tool 20 can be freely adjusted by the spindle 4.

It should be noted that the invention is not limited to the above-described example embodiments but includes modifications and the like as long as such modifications and the like are compatible with an object of the invention.

The press components 16, which are in a form of disc-shaped elastic components in the example embodiments, are optionally polygonal as long as the press components 16 are capable of rolling on the workpiece 9 during the movement of the welding tool 20 with respect to the workpiece 9, and are not necessarily plate-shaped but are optionally in a form of a roller made of a cylindrical elastic component.

In the example embodiments, the attitude of the press components 16 is optionally set so that the front side in an advancement direction is wider than a rear side. With the above attitude, a self-centering effect is achieved when the press components 16 roll on the workpiece 9, thereby reducing misalignment of the welding tool 20 in the advancement direction.

The rotation drive unit of the invention, which is embodied by the air motor(s) (the rotation drive unit 14) in the example embodiments, is optionally in a form of an electric motor whose electric power is supplied from the spindle head 5 through a cable.

The body 11, which is attached to the spindle 4 to enable the spindle 4 to change the direction of the body 11 in the example embodiment, is optionally attached to the spindle head 5. In this case, the metalworking shaft 13 is optionally connected to the spindle 4 to rotate the welding tool 20 by rotation force of the spindle 4. In this case, with a use of a multiaxis control machine tool 2, the direction of inclination of the body 11 and the welding tool 20 can be changed by controlling the direction of the spindle head 5.

The invention is applicable to a friction stir welding attachment, a friction stir welding head, and a friction stir welding machine.

LISTING OF REFERENCE NUMERALS

1 . . . friction stir welding machine, 2 . . . machine tool, 3 . . . table, 4 . . . spindle, 5 . . . spindle head, 6 . . . moving mechanism, 7 . . . bed, 8 . . . cover, 9 . . . workpiece, 10 . . . friction stir welding attachment, 11 . . . body, 12 . . . tapered shank, 121 . . . center through hole, 13 . . . metalworking shaft, 131 . . . attachment portion, 14 . . . rotation drive unit, 16 . . . press component, 161 . . . outer circumferential portion, 17 . . . outer circumferential component, 171 . . . extension component, 172 . . . sub shank, 173 . . . sub shank, 19 . . . friction stir welding head, 20 . . . welding tool, 61 . . . guide bar, 62 . . . slider, A . . . rotation axis of press component, R . . . rotation axis of metalworking shaft, W1, W2 . . . to-be-welded component, WL . . . joint line.

The invention claimed is:

1. A friction stir welding attachment comprising:
a body configured to be attached to a spindle or a spindle head of a machine tool;
a metalworking shaft rotatably supported by the body and including an attachment portion configured to attach a welding tool at an end thereof, and
a pair of press components supported by the body and arranged opposed to one another across the attachment portion to each respectively press a workpiece at a respective opposite side of the welding tool, wherein
the press components are each made of a disc-shaped elastic material and are each supported in a manner rotatable around a rotation axis diagonally intersecting a rotation axis of the metalworking shaft, and a portion of a first of the pair of press components configured to contact the workpiece is opposed to a portion of a second of the pair of press components configured to contact the workpiece.

2. The friction stir welding attachment according to claim 1, wherein the body is attached to the spindle, the friction stir welding attachment further comprising a rotation drive unit configured to rotate the metalworking shaft and disposed in the body.

3. The friction stir welding attachment according to claim 2, wherein the rotation drive unit comprises an air motor configured to be rotated by air supplied through an axial center of the spindle.

4. The friction stir welding attachment according to claim 1, wherein a profile of an outer circumferential portion of each of the press components in a cross section along a rotation axis is arc-shaped.

5. A friction stir welding head comprising:
the friction stir welding attachment according to claim 1; and
the welding tool attached to the friction stir welding attachment.

6. A friction stir welding machine comprising:
the friction stir welding attachment according to claim 1;
the welding tool attached to the friction stir welding attachment; and
the machine tool attached to the friction stir welding attachment.

7. The friction stir welding attachment according to claim 2, wherein a profile of an outer circumferential portion of each of the press components in a cross section along a rotation axis is arc-shaped.

8. A friction stir welding head comprising:
the friction stir welding attachment according to claim 2; and
the welding tool attached to the friction stir welding attachment.

9. A friction stir welding machine comprising:
the friction stir welding attachment according to claim 2;
the welding tool attached to the friction stir welding attachment; and
the machine tool attached to the friction stir welding attachment.

10. The friction stir welding attachment according to claim 3, wherein a profile of an outer circumferential portion of each of the press components in a cross section along a rotation axis is arc-shaped.

11. A friction stir welding head comprising:
the friction stir welding attachment according to claim 3; and
the welding tool attached to the friction stir welding attachment.

12. A friction stir welding machine comprising:
the friction stir welding attachment according to claim 3;
the welding tool attached to the friction stir welding attachment; and
the machine tool attached to the friction stir welding attachment.

13. A friction stir welding head comprising:
the friction stir welding attachment according to claim 4; and
the welding tool attached to the friction stir welding attachment.

14. A friction stir welding machine comprising:
the friction stir welding attachment according to claim 4;
the welding tool attached to the friction stir welding attachment; and the machine tool attached to the friction stir welding attachment.

\* \* \* \* \*

UNITED STATES PATENT AND TRADEMARK OFFICE
CERTIFICATE OF CORRECTION

| | | |
|---|---|---|
| PATENT NO. | : 12,285,817 B2 | Page 1 of 1 |
| APPLICATION NO. | : 18/271997 | |
| DATED | : April 29, 2025 | |
| INVENTOR(S) | : Kouichi Katoh et al. | |

It is certified that error appears in the above-identified patent and that said Letters Patent is hereby corrected as shown below:

On the Title Page

Inventors item (72), Line 2, delete "Shizuokja" and insert -- Shizuoka --

Signed and Sealed this
Third Day of June, 2025

Coke Morgan Stewart
*Acting Director of the United States Patent and Trademark Office*